(12) United States Patent
Akaki et al.

(10) Patent No.: US 9,132,713 B1
(45) Date of Patent: Sep. 15, 2015

(54) SUSPENSION OF VEHICLE

(71) Applicant: MAZDA MOTOR CORPORATION, Hiroshima (JP)

(72) Inventors: Hiroyuki Akaki, Higashihiroshima (JP); Takashi Nishi, Hiroshima (JP); Yuki Kusaka, Hiroshima (JP); Hiroshi Tanaka, Hiroshima (JP); Toshiyuki Manabe, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/626,335

(22) Filed: Feb. 19, 2015

(30) Foreign Application Priority Data

Mar. 18, 2014 (JP) ................................. 2014-054988

(51) Int. Cl.
*B60G 3/12* (2006.01)
*B60G 21/05* (2006.01)

(52) U.S. Cl.
CPC .................................... *B60G 21/052* (2013.01)

(58) Field of Classification Search
USPC ...................... 280/124.128, 124.13, 124.132, 280/124.149, 124.152
See application file for complete search history.

(56) References Cited

U.S. PATENT DOCUMENTS

| 5,324,073 | A | * | 6/1994 | Alatalo et al. | 280/124.116 |
| 7,665,752 | B2 | * | 2/2010 | Lee | 280/124.137 |
| 8,308,175 | B2 | * | 11/2012 | Choi et al. | 280/124.106 |
| 8,490,990 | B2 | * | 7/2013 | Lepre | 280/124.116 |
| 2006/0108762 | A1 | * | 5/2006 | Cho | 280/124.128 |
| 2006/0220339 | A1 | * | 10/2006 | Kusaka et al. | 280/124.166 |
| 2007/0126200 | A1 | * | 6/2007 | Ogawa et al. | 280/124.169 |
| 2010/0264614 | A1 | * | 10/2010 | Borgna et al. | 280/124.128 |
| 2013/0093156 | A1 | * | 4/2013 | Buschjohann et al. | 280/124.128 |
| 2014/0151973 | A1 | * | 6/2014 | Baumer et al. | 280/124.128 |

FOREIGN PATENT DOCUMENTS

| JP | H04-283114 A | 10/1992 |
| JP | H08-324218 A | 12/1996 |
| JP | 2005-306177 A | 11/2005 |

* cited by examiner

*Primary Examiner* — Toan To
(74) *Attorney, Agent, or Firm* — Studebaker & Brackett PC

(57) ABSTRACT

A torsion beam is configured in an arch shape and comprised of an open cross-section member including an arch lower-half portion and an arch upper-half portion. A sectional shape of the arch lower-half portion in a cross section perpendicular to a longitudinal direction of the arch lower-half portion is configured to be substantially horizontal when a vehicle is in a standard state, and a central portion, in the vehicle width direction, of the torsion beam is configured such that a front edge portion of the arch lower-half portion and a front edge portion of the arch upper-half portion are located substantially at the same position in a vehicle longitudinal direction when the vehicle is in a full-rebound state. Thereby, the rigidity and the productivity can be endured, attaining low floor-level of the vehicle.

6 Claims, 8 Drawing Sheets

SUSPENSION OF VEHICLE

BACKGROUND OF THE INVENTION

The present invention relates to a suspension of a vehicle, and in particular relates to a torsion-beam type of suspension provided with a torsion beam which is connected to a pair of right-and-left trailing arms.

Conventionally, a torsion-beam type of suspension, which comprises a pair of right-and-left trailing arms, front end portions of which are pivotally supported at a vehicle body below a floor panel and rear end portions of which rotatably support a pair of right-and-left wheels and a torsion beam extending in a vehicle width direction, both end portions, in the vehicle width direction, of which are connected to the pair of right-and-left trailing arms, is known. In the torsion-beam type of suspension, the torsion beam which is comprised of an open cross-section member which includes a pair of half portions (a one-side half portion and an other-side half portion) extending in its longitudinal direction and has a U-shaped cross section or the like performs the functions of a torsion bar as well as a spring. This type of suspension has a simple structure and a small number of parts, so it is advantages in terms of costs and layout space. Thus, the torsion-beam type of suspension has been widely applied to a rear suspension of F-F (front-engine front-drive) vehicles.

In vehicles, such as F-R (front-engine rear-drive) vehicles or four-wheel drive vehicles, in which rear wheels are driven, a drive force of an engine installed at a vehicle-body front portion is transmitted to a differential gear device installed at a vehicle-body rear portion via a propeller shaft extending longitudinally at a central portion, in a vehicle width direction, of the vehicle. Accordingly, it is required that the above-described torsion beam is configured to project upward at its central portion in order to avoid any interference with the propeller shaft. Meanwhile, as shown in FIG. 10, in the torsion-beam type of suspension, the wheel supported by this suspension swings with a theoretical swing axis which corresponds to a straight line A which interconnects a shear center C positioned behind the central portion of a torsion beam B and a front end portion F of the trailing arm. Therefore, in a case in which the central portion, in the vehicle width direction, of the torsion beam B curves upward, the shear center C also moves upward according to this curving of the torsion beam B. Consequently, there occurs a problem in that the alignment-change characteristics of the suspension may change improperly.

A suspension disclosed in Japanese Patent Laid-Open Publication No. H4-283114 is configured, in order to restrain the torsion beam's sheer center from moving upward, such that a torsion beam has a curve portion curing upward at a central portion, in the vehicle width direction, thereof and an open cross-section of the torsion beam opens upward, so that the shear center of the torsion beam is located at the level below the torsion beam. In general, a long member, such as the torsion beam, has a tendency that in a case in which it has a bending portion at some point in its longitudinal direction, a cross-section crumbling happens to this bending portion of the long member, so that the rigidity decreases. Therefore, there is a problem in that if the upward curve portion is formed at the central portion, in the vehicle width direction, of the torsion beam, the rigidity of the curve portion of the torsion beam may decrease improperly, so that the vehicle may be inferior in the maneuverability and stability.

A suspension disclosed in Japanese Patent Laid-Open Publication No. H8-324218 is configured such that a torsion beam comprises a curve-shaped central portion which projects upward and a pair of straight-shaped portions which are smoothly continuous from both end portions of the curve-shaped central portion via curve portions having the radius of curvature which changes continuously from that of the curve-shaped central portion. Herein, a large amount of bending moment is generated at the straight-shaped portions located at the both end portions of the torsion beam and a small amount of bending moment is generated at the curve-shaped central portion, so that the rigidity of the torsion beam can be improved.

When a large external force acts on a wheel, this external force is transmitted via the trailing arm such that a vertical load of that is transmitted to a shock absorber and the like and a torsional load and a lateral force of that is transmitted to the torsion beam. The torsional load and the lateral force are absorbed by bending of the torsion beam itself and closing deformation of the open cross-section which is formed by the one-side half portion and the other-side half portion. Herein, in order that the torsion beam ensures the torsional rigidity and the rigidity against the lateral force, a crushed pipe type of torsion beam, in which the torsion beam which is made of a cylindrical pipe member is crushed (pressed) from a direction perpendicular to an axis of the pipe member over its longitudinal direction so as to have a cross section formed in a V or U shape with a peak portion, is also known. The rigidity of this torsion beam can be changed by changing the size of a hollow portion formed by both end portions in the cross section of the torsion beam. A torsion beam disclosed in Japanese Patent Laid-Open Publication No. 2005-306177 is configured to have the cross section formed in the V or U shape with the peak portion, the hollow portion formed by the both end portions in the cross section, and a gap formed between a pair of one-side half portion and other-side half portion of the torsion beam which expands continuously from the peak portion interconnecting the both half portions toward the both end portions.

The suspension of the above-described first patent document can restrain the sheer center of the torsion beam from moving upward, so that changing of the alignment-change characteristics of the suspension can be prevented when the wheel is in a bound state or in a rebound state. However, the suspension of the first patent document has a problem in that the productivity of the torsion beam may deteriorate. That is, since the torsion-beam type of suspension is configured such that the open cross-section formed by the one-side half portion and the other-side half portion which respectively extend in the longitudinal direction of the torsion beam opens upward, there is a concern that water or the like splashed by the wheels may stay inside the open cross-section of the torsion beam. Therefore, it may be required that some holes for draining such water or the like are formed at the peak portion of the torsion beam. In a case in which the crushed pipe type of torsion beam disclosed in the above-described third patent document is used, it may be necessary that anti-rusting treatment or the like are applied to the hollow portion, so that forming of such drain holes may become uneasy.

The suspension of the above-described second patent document enables welding of a reinforcing member by configuring the torsion beam such that the both end portions, in the vehicle width direction, thereof are straight-shaped, so that the rigidity and the durability of the suspension can be improved. However, the suspension of the second patent document may not be sufficient in rigidity improvement of the torsion beam. That is, since the curve-shaped central portion and the straight-shaped both-end portions are continuous via the curve portions, an axial center of the curve-shaped central portion and an axial center of the straight-shaped end portion cross each other at a specified angle, so that a stress concentration portion where a stress concentrates is formed at the curve portion. Therefore, the rigidity of the curve portion relatively decreases, comparing with the other portion of the torsion beam. Thus, the suspension of the first patent document may have the same problem.

Meanwhile, low-floor vehicles in which a floor panel is located at a low level are desired from aspects of a wide space, in a vertical direction, of a vehicle compartment or an easy access (ingress/egress) of passengers or an easy loading/unloading of baggage. However, since the suspensions of the above-described first or second patent documents have the upward-curve portion at the central portion, in the vehicle width direction, of the torsion beam and therefore this upward-curve portion possibly interferes with the floor panel when the vehicle is in the full-rebound state, there is a concern that the floor of the vehicle may not be positioned at a sufficiently low level.

SUMMARY OF THE INVENTION

An object of the present invention is to provide a suspension of a vehicle which can properly ensure the rigidity and the productivity, attaining low floor-level of the vehicle.

According to the present invention, there is provided a suspension of a vehicle, comprising a pair of right-and-left trailing arms, front end portions of which are pivotally supported at a vehicle body below a floor panel and rear end portions of which rotatably support a pair of right-and-left wheels, and a torsion beam extending in a vehicle width direction, both end portions, in the vehicle width direction, of which are connected to the pair of right-and-left trailing arms, wherein the torsion beam is configured in an arch shape such that a central portion, in the vehicle width direction, thereof projects forward and upward in a slant shape, the central portion being located above the level of a wheel center, the torsion beam is comprised of an open cross-section member which includes an arch lower-half portion and an arch upper-half portion, a rear end portion of the arch lower-half portion being formed integrally with a rear end portion of the upper-half portion, and a sectional shape of the arch lower-half portion in a cross section perpendicular to a longitudinal direction of the arch lower-half portion is configured to be substantially horizontal when the vehicle is in a standard state, and the central portion, in the vehicle width direction, of the torsion beam is configured such that a front edge portion of the arch lower-half portion and a front edge portion of the arch upper-half portion are located substantially at the same position in a vehicle longitudinal direction when the vehicle is in a full-rebound state.

In the present suspension of the vehicle, since the torsion beam is configured in the arch shape such that its central portion projects forward and upward in the slant shape and is located above the level of the wheel center, some space can be ensured below the torsion beam, and also the rigidity can be improved properly because any stress concentration portion which may be caused by crossing of the axial center of the torsion beam over the longitudinal direction of the torsion beam is not formed. Further, since the torsion beam is comprised of the open cross-section member which includes the arch lower-half portion and the arch upper-half portion, the rear end portion of the arch lower-half portion being formed integrally with the rear end portion of the upper-half portion, and the sectional shape of the arch lower-half portion in the cross section perpendicular to the longitudinal direction of the arch lower-half portion is configured to be substantially horizontal when the vehicle is in the standard state, and the central portion, in the vehicle width direction, of the torsion beam is configured such that the front edge portion of the arch lower-half portion and the front edge portion of the arch upper-half portion are located substantially at the same position in the vehicle longitudinal direction when the vehicle is in the full-rebound state, the floor panel can be located at a lower level by the amount of closing deformation of the open cross-section in the vehicle's full-rebound state, by utilizing closing deformation of the open cross-section formed by the arch upper-half portion and the arch lower-half portion which occurs because of absorption of the torsional load. Moreover, since the sectional shape of the arch lower-half portion is configured to be substantially horizontal when the vehicle is in the standard state and be in a slant shape such that its front is located at a lower level than its rear when the vehicle is in the full-rebound state, it can be prevented that water or the like stay inside the open cross-section of the torsion beam, so that any hole for draining such water or the like can be omitted, therefore the productivity of the torsion beam can be improved improperly.

According to an embodiment of the present invention, the vehicle is provided with a rear-wheel drive device which is arranged at a vehicle-body rear portion and a propeller shaft which is connected to the rear-wheel drive device via a connection portion and extends in the vehicle longitudinal direction, and the propeller shaft is arranged to pass through a space formed below the torsion beam. Thereby, any interference of the torsion beam with the propeller shaft can be prevented properly, so that this suspension is applicable to the vehicle provided with the rear wheels as a driving wheel.

According to another embodiment of the present invention, the torsion beam is configured such that a rear end portion thereof is located at a position near and above the connection portion when the vehicle is in the full-rebound state. Thereby, any interference of the torsion beam with the rear-wheel drive device including the connection portion in the vehicle's full-rebound state can be prevented properly.

According to another embodiment of the present invention, the torsion beam is configured such that the central portion, in the vehicle width direction, of the arch upper-half portion is located at a position near and below a seat-cushion attachment portion formed at the floor panel when the vehicle is in the full-rebound state. Thereby, any interference of the torsion beam with the seat-cushion attachment portion which is located near the torsion beam and at the lowest level of the floor panel can be prevented properly.

Other features, aspects, and advantages of the present invention will become apparent from the following description which refers to the accompanying drawings.

DETAILED DESCRIPTION OF THE INVENTION

Hereinafter, an embodiment of the present invention will be described specifically referring to the accompanying drawings. The following descriptions merely exemplify the present invention substantially, so the present invention and its applications or uses should not be limited by the descriptions.

Figure 1:
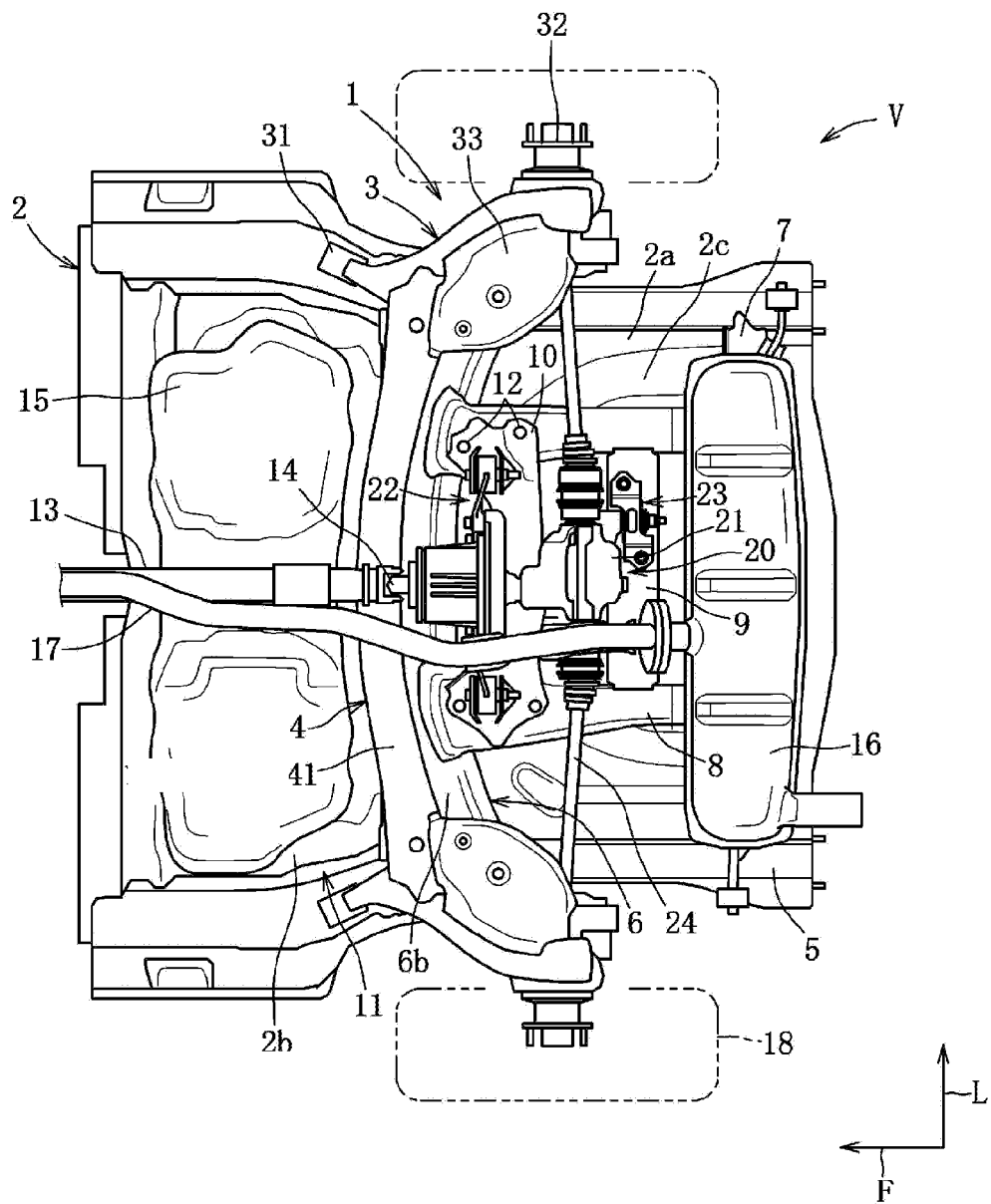
FIG. 1 is a bottom view of a rear portion of a vehicle provided with a suspension according to the present embodiment.

A suspension 1 of a vehicle V according to the present embodiment comprises, as shown in FIG. 1, a pair of right-and-left trailing arms 3 which are pivotally supported at a vehicle body below a floor pane 2 at their front end portions and rotatably support a pair of wheels 18 at their rear end portions, a torsion beam 4 which extends in a vehicle width direction and is connected to the pair of right-and-left trailing arms 3 at its both end portions, and others. In the figures, an arrow F shows a forward direction and an arrow L shows a left direction.

Figure 2:
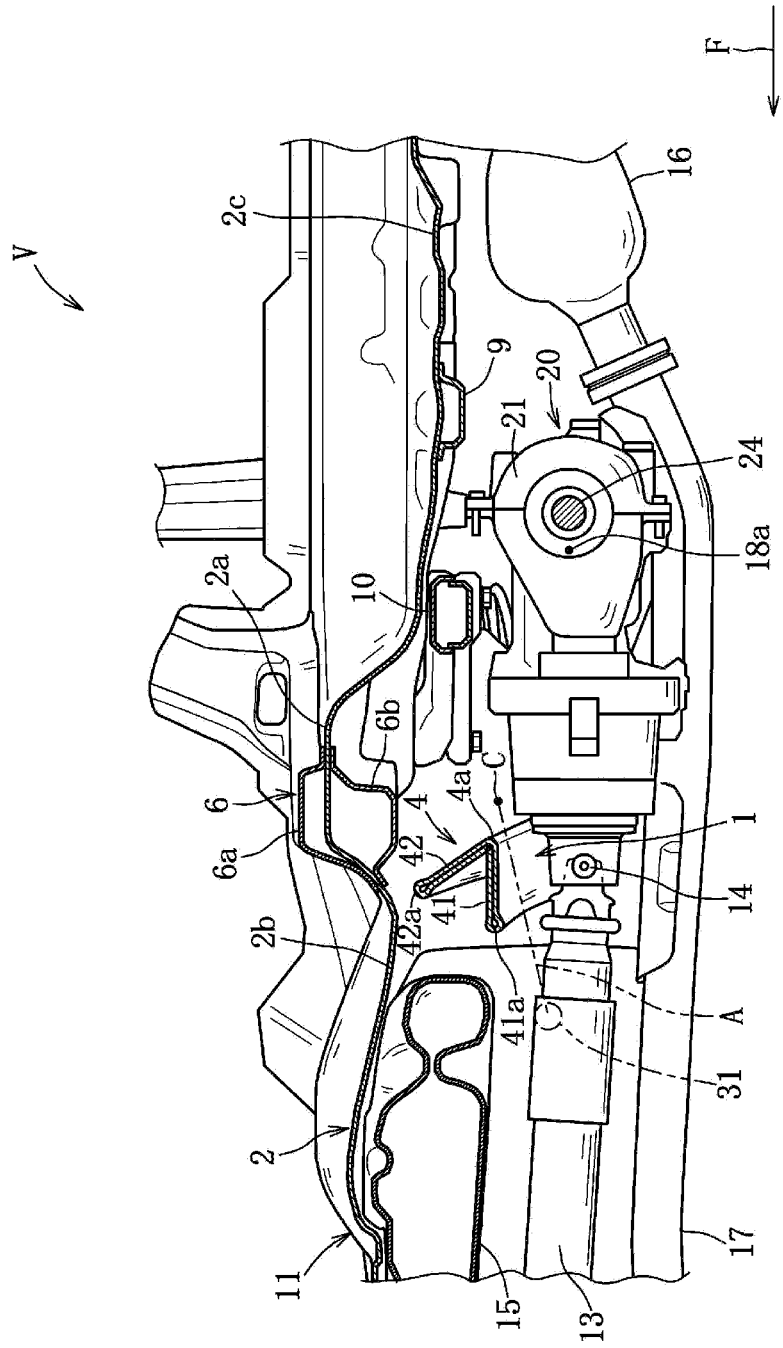
FIG. 2 is a sectional view taken along line II-II of FIG. 1 when the vehicle is in a standard state.
Figure 3:
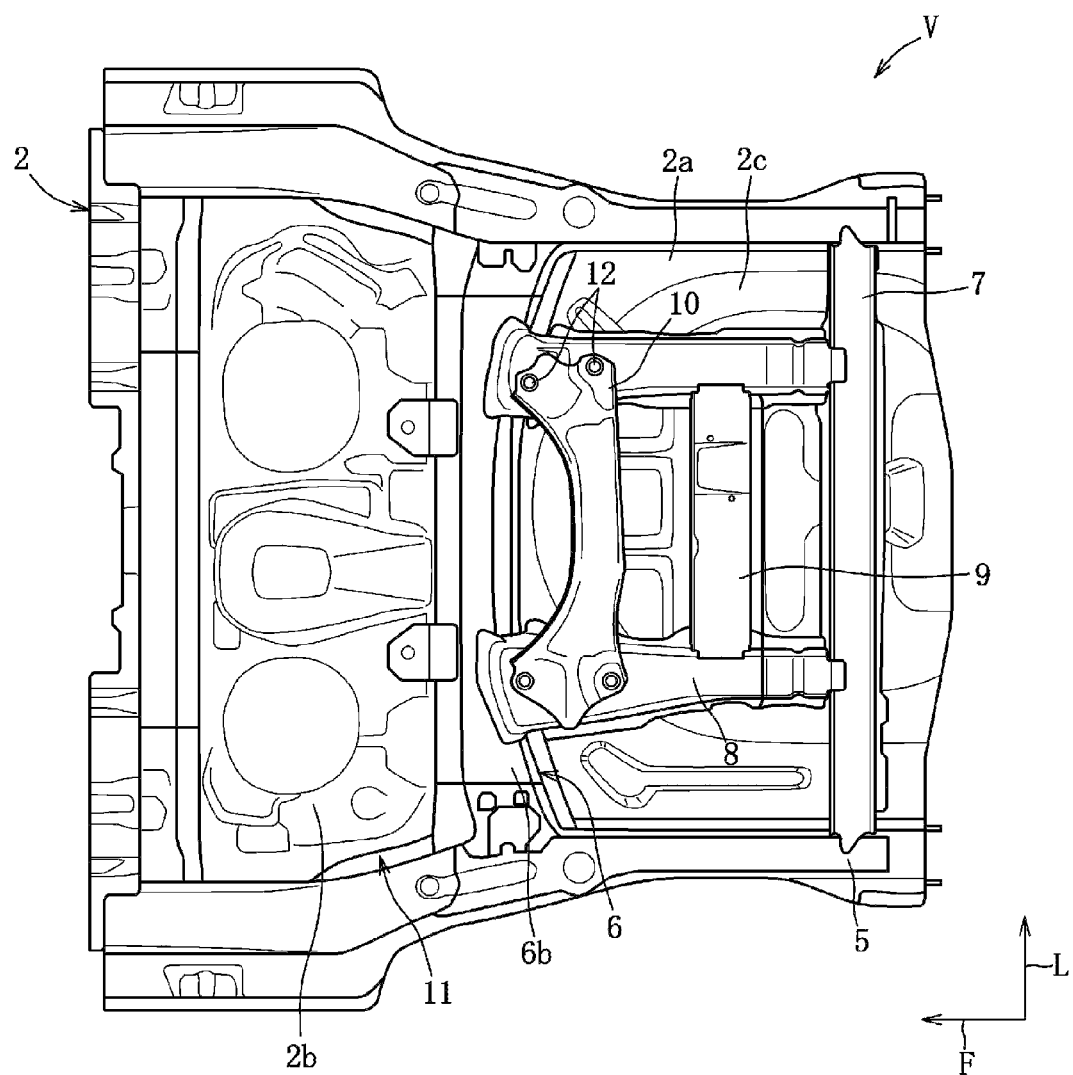
FIG. 3 is a view which corresponds to FIG. 1, in which an exhaust device, a rear drive device, and the suspension are omitted.

First, a rear portion of a vehicle body at which the suspension 1 of the vehicle V is supported will be described briefly. As shown in FIGS. 1-3, the vehicle body of the vehicle V comprises the floor panel 2 which forms a floor face of a vehicle compartment, a pair of right-and-left rear side frames 5, a No. 4 cross member 6 which extends between the pair of rear side frames 5 at a position located in back of a rear-seat cushion attachment portion 2b, a No. 5 cross member 7 which extends between the pair of rear side frames 5 at a position located in back of the No. 4 cross member 6, a pair of right-and-left longitudinal members 8 which extend between the No. 4 cross member 6 and the No. 5 cross member 7, a supplementary member 9 which extends between the pair of right-and-left longitudinal members 8, a support member 10 which extends between the pair of right-and-left longitudinal members 8 at a position located in front of the supplementary member 9, and others.

The floor panel 2 comprises a front floor panel (not illustrated) which forms a floor face of the vehicle compartment other than a baggage space and a rear floor panel 2a which has a spare tire pan 2c at a position located in back of the No. 4 cross member 6. The lowest position of the spare tire pan 2c is located substantially at the same level (depth) as the lowest position of the rear-seat cushion attachment portion 2b. A silencer 16 is fixed to a rear end of an exhaust pipe 17 below the spare tire pan 2c.

The pair of right-and-left rear side frames 5 extend longitudinally, overhanging rearward. A kick-up portion 11 is formed by a rear floor panel 2a which extends obliquely rearward and upward from a rear end of the front floor panel between the pair of right-and-left rear side frames 5, and the No. 4 cross member 6 is formed at a top of the kick-up portion 11. A fuel tank 15 is arranged below the kick-up portion 11.

As shown in FIGS. 2 and 3, the No. 4 cross member 6 includes an upper cross member 6a having a hat-shaped cross section and a lower cross member 6b having an inverse hat-shaped cross section. The upper cross member 6a forms an upper-side closed cross section together with an upper face of the rear floor panel 2a, and the lower cross member 6b forms a lower-side closed cross section together with a lower face of the rear floor panel 2a. The No. 5 cross member 7 is configured to have a hat-shaped cross section, and forms a closed cross section extending substantially straightly in the vehicle width direction in a plan view together with the lower face of the rear floor panel 2a including the spare tire pan 2c.

Each of the pair of right-and-left longitudinal members 8 is configured to have a hat-shaped cross section, and forms a closed cross section extending substantially straightly in a vehicle longitudinal direction in the plan view on an inward side, in the vehicle width direction, of the pair of right-and-left rear side frames 5 together with the lower face of the rear floor panel 2a including the spare tire pan 2c. The supplementary member 9 is configured to have a hat-shaped cross section, and forms a closed cross section extending in the vehicle width direction substantially in parallel to the No. 5 cross member 7 on a forward side of the No. 5 cross member 7 together with a lower face of the spare tire pan 2c. The support member 10, which is made of a closed cross-section member, is fixed to front end portions of the pair of right-and-left longitudinal members 8 at its both ends by means of two bolts 12, respectively, at a position near and in back of the No. 4 cross member 6.

Figure 4:
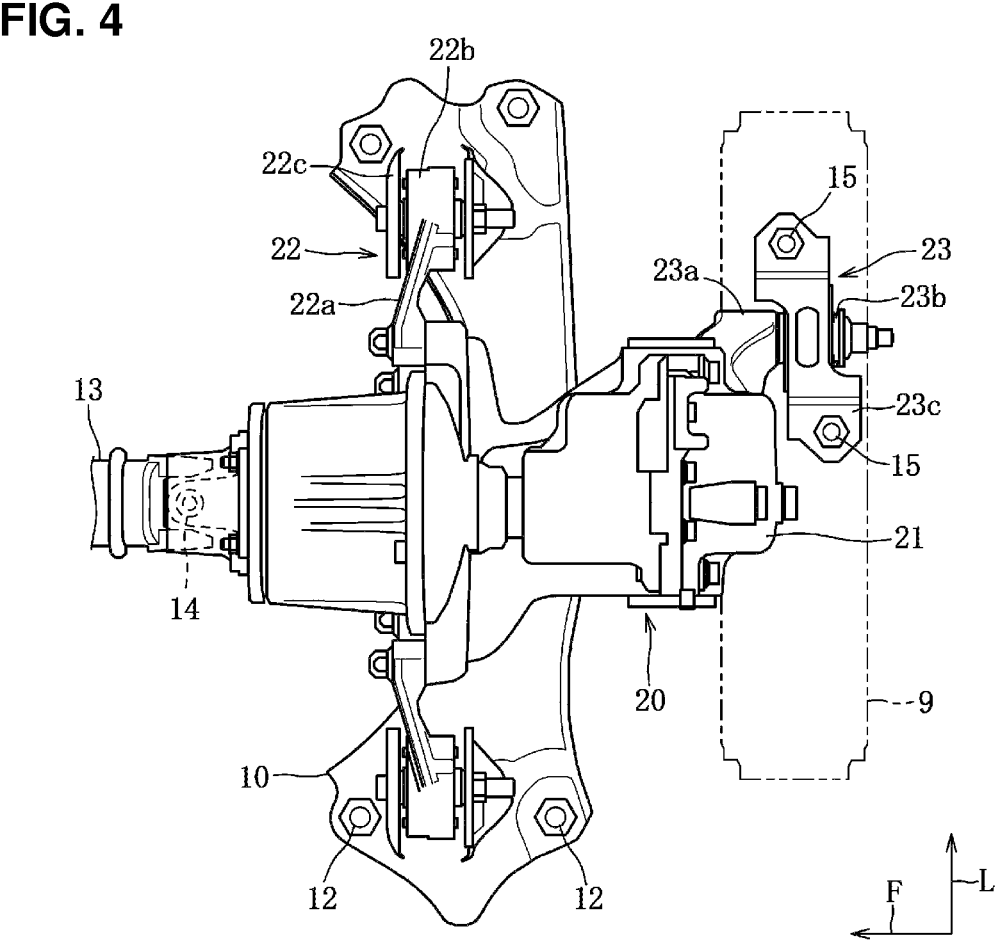
FIG. 4 is a bottom view of the rear drive device.
Figure 5:
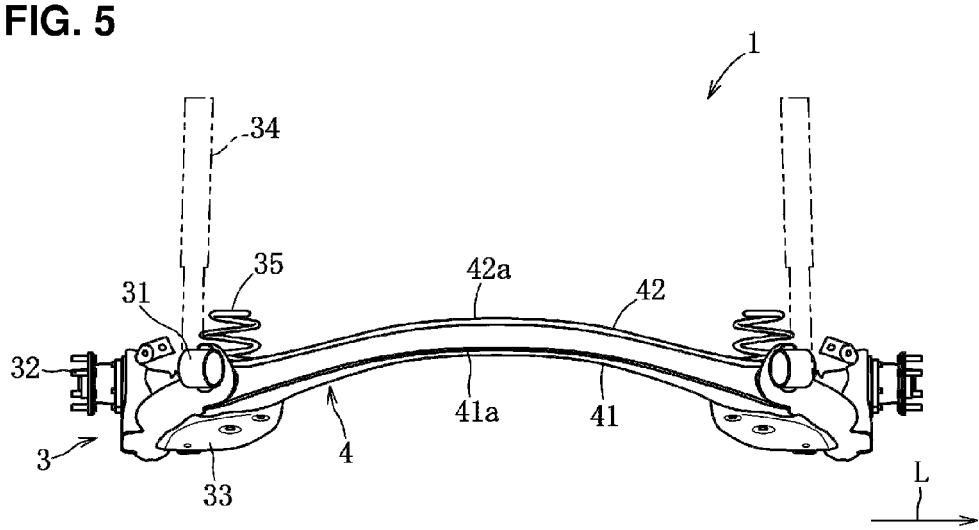
FIG. 5 is a front view of the suspension.
Figure 6:
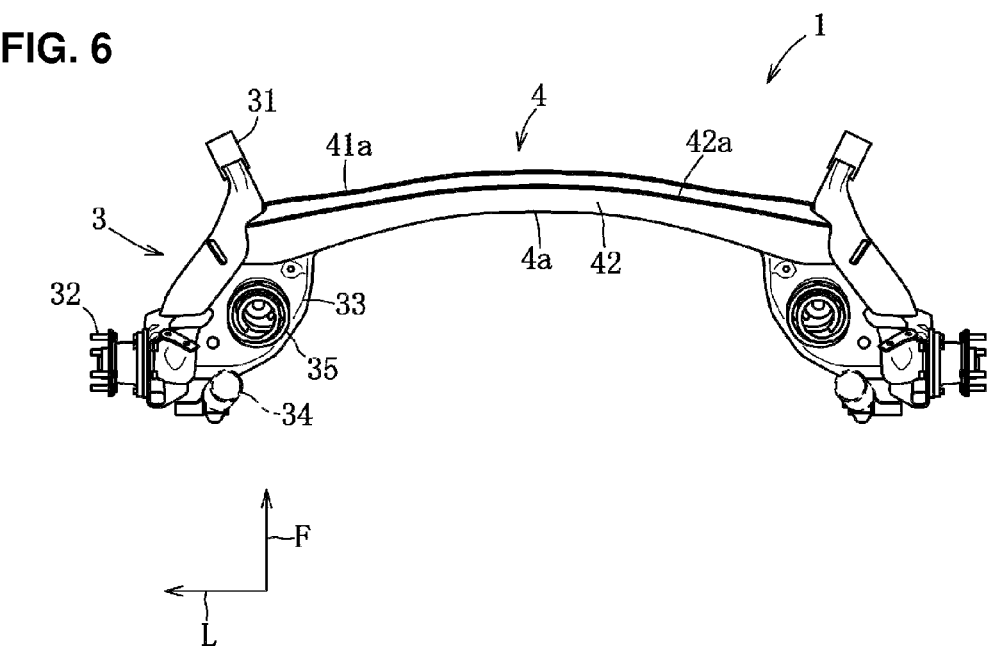
FIG. 6 is a plan view of the suspension.
Figure 7:
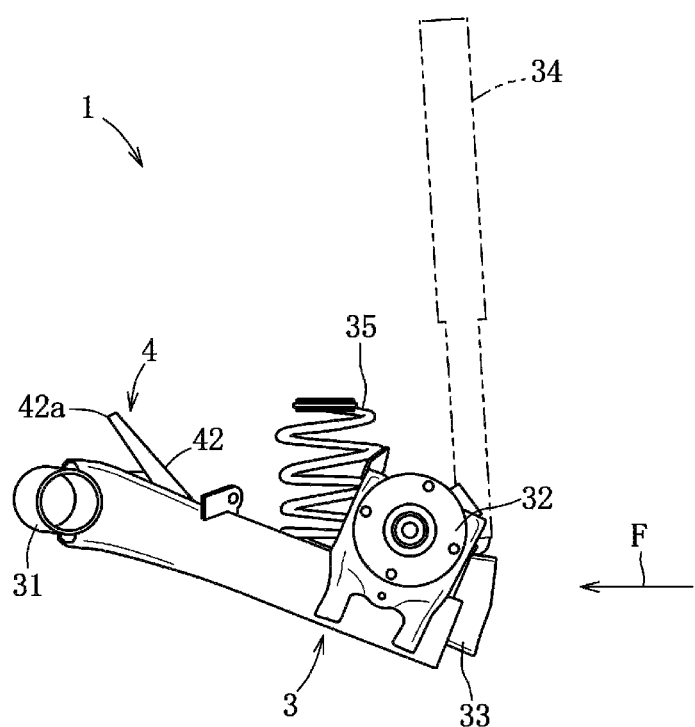
FIG. 7 is a side view of the suspension.
Figure 8:
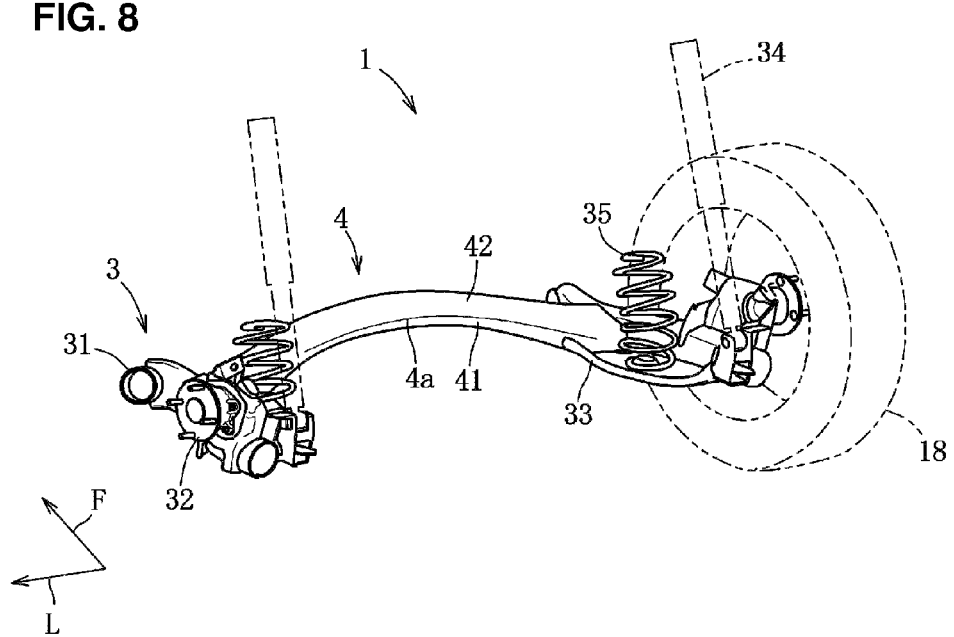
FIG. 8 is a rear perspective view of the suspension.

Next, the constitution of a drive system of the vehicle V will be described. As shown in FIGS. 1, 2 and 4, the vehicle V is provided with a propeller shaft 13 which extends longitudinally and transmits a drive force of an engine (not illustrated) installed to a front portion of the vehicle to the rear portion of the vehicle body and a rear-wheel drive device 20 which is connected to a rear end portion of the propeller shaft 13 via a connection portion 14 and transmits the drive force of the engine to the right-and-left rear wheels 18. The rear-wheel drive device 20 comprises a body 21 which is provided with a pair of right-and-left drive shafts 24 and comprised of a differential mechanism, a pair of right-and-left front support portions 22 which support a front portion of the body 21 at the support member 10, and a rear support portion 23 which supports a rear portion of the body 21 at the supplementary member 9. The rear-wheel drive device 20 is supported at the rear portion of the vehicle body at three front-and-rear points.

The front support portion 22 comprises a front mount portion 22a which extends outward in the vehicle width direction from the body 21 and a front differential mount 22b which is provided at a tip of the front mount portion 22a and has a vibration absorption function. The front differential mount 22b is fixed to the support member 10 via an attaching bracket 22c. The attaching bracket 22c is fastened to the support member 10 by means of two bolts (not illustrated).

The rear support portion 23 comprises a rear mount portion 23a which extends rearward from the body 21 and a rear differential mount 23b which is provided at the rear mount portion 23a and has a vibration absorption function. The rear differential mount 23b is fixed to the supplementary member 9 via an attaching bracket 23c. The attaching bracket 23c is fastened to the supplementary member 9 by means of a pair of right-and-left bolts 15 at its right-and-left both end portions.

The rear mount portion 23a is provided to be laterally offset from a central portion, in the vehicle width direction, of the supplementary member 9, and located at a higher level than the connection portion 14 (an axial center of the propeller shaft 13). Accordingly, when an impact load acts from a vehicle-body front side, the front mount portion 22a is broken by the load inputted to the body 21 by way of the propeller shaft 13 and then the body 21 is rotated forward and downward around the center of the rear differential mount 23b, so that a desired impact absorption performance can be attained.

Hereinafter, a specific structure of the suspension 1 of the vehicle V will be described. As shown in FIGS. 1, 5-8, the suspension 1 is the torsion beam type of suspension which comprises the pair of right-and-left trailing arms 3 rotatably supporting the pair of wheels 18 at their rear end portions and the torsion beam 4 extending in the vehicle width direction and connected to the pair of right-and-left trailing arms 3 at their both end portions.

The pair of right-and-left trailing arms 3 are configured such that the distance, in the vehicle width direction, therebetween increases gradually toward a vehicle rear side, respective front end portions of which are supported at respective lower portions of the pair of right-and-left rear side frames 5 via a pair of joints 31 which include a laterally-extending pivotal axis and a rubber bush, respectively. A carrier 32 is provided at a rear end portion of the trailing arm 3. This carrier 32 rotatably supports the wheel 18 driven by the drive shaft 24. A shock absorber 34 which interconnects a vehicle-body side and the rear end portion of the trailing arm 3 with the shock absorption function is provided near the carrier 32.

A gusset 33 which is welded to an end portion of the torsion beam 4 and a middle portion of the trailing arm 3 is provided on an inward side of the trailing arm 3 over a range from the middle portion to the rear end portion of the trailing arm 3. Between this gusset 33 and the vehicle body is provided a compressive coil spring 35 which performs a vibration absorption mechanism of the vehicle V in cooperation with the shock absorber 34. A lower end portion of the compressive coil spring 35 is supported at the gusset 33.

As shown in FIGS. 2, 5-8, the torsion beam 4 extends in the vehicle width direction and is joined by welding to the middle portion of the pair of right-and-left trailing arms 3 at its both end portions, and both-end rear portions of the torsion beam 4 are joined by welding to respective front wall portions of the pair right-and-left gussets 33. The torsion beam 4 is configured in an arch (arc) shape such that a central portion, in the vehicle width direction, thereof projects forward and upward in a slant shape, the central portion being located above the level of a wheel center 18a. Thus, the propeller shaft 13 is arranged to extend through a space formed below the central portion of the torsion beam 4 so that any interference of the propeller shaft 13 with the torsion beam 4 can be prevented.

The torsion beam 4 is made of a cylindrical pipe member that is crushed (pressed) from a direction perpendicular to an axis of the pipe member over its longitudinal direction so as to have a cross section formed substantially in a V shape. The torsion beam 4 comprises an arch lower-half portion 41 and an arch upper-half portion 42, a rear end portion of which is formed integrally with a rear end portion of the arch lower-half portion 41. The torsion beam 4 is configured such that the width in a direction which is perpendicular to an axial center of the arch lower-half portion 41 is almost equal to the width in a direction which is perpendicular to an axial center of the arch upper-half portion 42. Accordingly, the wheel 18 swings with a swing axis which corresponds to the straight line A interconnecting the shear center C positioned behind a central portion, in the vehicle width direction, of a peak portion 4a of the torsion beam 4 and the joint 31 (torsion beam pivot) of the trailing arm 3. When the external force acts on one of the pair of wheels 18 and the other wheel 18 moves in an inverse phase, the external force is absorbed through bending of the torsion beam 4 itself and closing deformation of the open cross-section which is formed by the arch lower-half portion 41 and the arch upper-half portion 42.

As shown in FIG. 2, the torsion beam 4 is configured such that a sectional shape of the arch lower-half portion in a cross section perpendicular to a longitudinal direction of the arch lower-half portion 41 is substantially horizontal when the vehicle V is in a standard state. Herein, the standard state of the vehicle V means a basic state in which the vehicle is traveling or stops, differently from a full-bound state or a full-rebound state of the vehicle, which may be considered as a state in which the vehicle has substantially no loads or a design state (in which the vehicle has two adults as passengers with a fuel tank filled up, for example).

Figure 9:
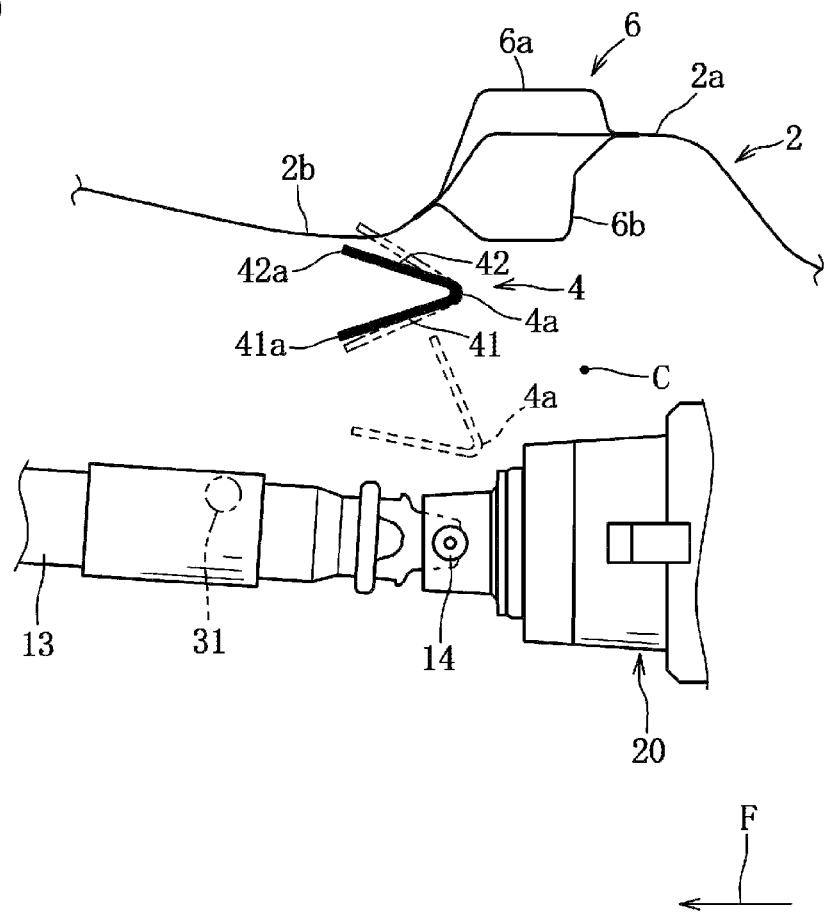
FIG. 9 is a diagram showing shapes of a cross section of a torsion beam, in which the cross section when an open cross-section deforms in a full-bound state is illustrated by a solid line, the cross section when the open cross-section does not deform in a full-rebound state is illustrated by an imaginary line, and the cross section in the full-rebound state is illustrated by a broken line.
Figure 10:
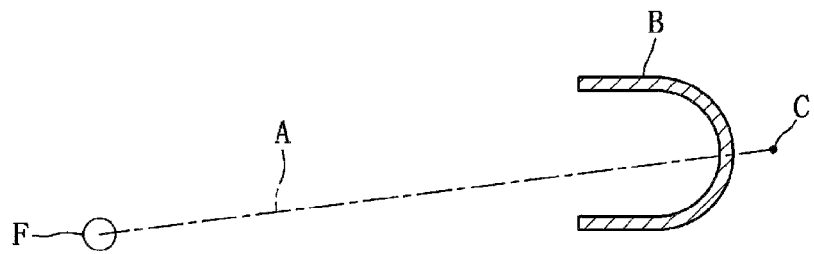
FIG. 10 is a vertical sectional view showing relationships of a shear center of the torsion beam having an open cross-section opening forward, a pivotal point of a trailing arm, and a swing axis of a wheel.

As shown by the solid line in FIG. 9, the central portion, in the vehicle width direction, of the torsion beam 4 is configured such that when the vehicle V is in the full-rebound state, a front edge portion 41a of the arch lower-half portion 41 and a front edge portion 42a of the arch upper-half portion 42 are located substantially at the same position in the vehicle longitudinal direction and the level of the peak portion 4a of the torsion beam 4 is set at a middle position between the level of the front edge portion 41a and the level of the front edge portion 42a. Herein, the central portion, in the vehicle width direction, of the arch upper-half portion 41 is positioned near and below the rear-seat cushion attachment portion 2b formed at the rear floor panel 2a.

The torsion beam 4 deforms, when absorbing the torsional load generated in the vehicle's full-rebound state, in such a manner that the open cross-section formed by the arch lower-half portion 41 and the arch upper-half portion 42 has closing deformation, so that the rear-seat cushion attachment portion 2b is designed to be located at a lower level by the amount of the closing deformation of the open cross-section. That is, while it is predicted that the front edge portion 42a of the arch upper-half portion 42 interferes with the rear-seat cushion attachment portion 2b in the vehicle's full-bound state as shown by the imaginary line in FIG. 9 if the above-described closing deformation is not considered, the rear floor panel 2a can be located at a lower level by utilizing the above-described closing deformation which occurs due to the actual torsional-load absorption.

As shown by the broken line in FIG. 9, the torsion beam 4 is configured such that when the vehicle V is in the full-rebound state, the open cross section of the torsion beam 4 opens upward and the peak portion 4a of the torsion beam 4 is positioned in a dead space which is formed near and above the connection portion 14 connecting the rear end portion of the propeller shaft 13 and the front end portion of the rear-wheel drive device 20.

Next, the operations and effects of the above-described suspension 1 of the vehicle V will be described. Since the torsion beam 4 is configured in the arch shape such that its central portion projects forward and upward in the slant shape and is located above the level of the wheel center 18a, some space can be ensured below the torsion beam 4, and also the rigidity can be improved properly because any stress concentration portion which may be caused by crossing of the axial center of the torsion beam over the longitudinal direction of the torsion beam 4 is not formed. Further, any level difference between the shear center C and the joint 31 of the trailing arm 3 can be restrained, so that changing of the alignment-change characteristics of the suspension can be prevented. Since the torsion beam 4 is comprised of the open cross-section member which includes the arch lower-half portion 41 and the arch upper-half portion 42, the rear end portion of the arch lower-half portion 41 being formed integrally with the rear end portion of the upper-half portion 42, and the sectional shape of the arch lower-half portion 41 in the cross section perpendicular to the longitudinal direction of the arch lower-half portion 41 is configured to be substantially horizontal when the vehicle V is in the standard state, and the central portion, in the vehicle width direction, of the torsion beam 4 is configured such that the front edge portion 41a of the arch lower-half portion 41 and the front edge portion 42a of the arch upper-half portion 42 are located substantially at the same position in the vehicle longitudinal direction when the vehicle V is in the full-rebound state, the floor panel 2 can be located at the lower level by the amount of closing deformation of the open cross-section in the vehicle's full-rebound state, by utilizing the closing deformation of the open cross-section formed by the arch upper-half portion 42 and the arch lower-half portion 41 which occurs due to absorption of the torsional load. Moreover, since the sectional shape of the arch lower-half portion 41 is configured to be substantially horizontal when the vehicle V is in the standard state and be in the slant shape such that its front is located at a lower level than its rear when the vehicle V is in the full-rebound state, it can be prevented that water or the like stay inside the open cross-section of the torsion beam 4, so that any hole for draining such water or the like can be omitted and therefore the productivity of the torsion beam 4 can be improved improperly.

Since the vehicle V is provided with the rear-wheel drive device 20 which is arranged at the vehicle-body rear portion and the propeller shaft 13 which is connected to the rear-wheel drive device 20 via the connection portion 14 and extends in the vehicle longitudinal direction, and the propeller shaft 13 is arranged to pass through the space formed below the torsion beam 4, any interference the torsion beam 4 with the propeller shaft 13 can be prevented properly, so that this suspension 1 is applicable to the vehicle V with the rear wheels 18 as the driving wheel.

Since the torsion beam 4 is configured such that the rear end portion thereof is located at a position near and above the connection portion 14 when the vehicle V is in the full-rebound state, any interference of the torsion beam 4 with the rear-wheel drive device 20 including the connection portion 14 in the vehicle's full-rebound state can be prevented properly.

Since the torsion beam 4 is configured such that the central portion, in the vehicle width direction, of the arch upper-half portion 42 is located at a position near and below the seat-cushion attachment portion 2b formed at the rear floor panel 2a when the vehicle V is in the full-rebound state, any interference of the torsion beam 4 with the seat-cushion attachment portion 2b which is located near the torsion beam 4 and at the lowest level of the rear floor panel 2a can be prevented properly.

Lastly, modifications partially modified from the above-described embodiment will be described.

While the above-described embodiment describes the example of the rear-wheel drive vehicle equipped with the propeller shaft, any vehicle is applicable as long as the central portion, in the vehicle width direction, of the torsion beam of thereof projects upward. The vehicle provided with no propeller shaft can provide the same effects of the present invention described above.

While the above-described embodiment describes the example in which a portion of the torsion beam is located at the position near and below the rear-seat cushion attachment portion when the vehicle is in the full-rebound state, any other example is applicable as long as the torsion beam can be prevented from interfering with the lowest portion of the vehicle-body member while the torsion beam moves. In a case in which the above-described lowest portion of the vehicle-body member is a cross member located at the lowest level, it is preferable that the torsion beam be provided so as to prevent its interference with the cross member.

While the above-described embodiment describes the example in which the torsion beam has the V-shaped cross section, a torsion beam having any shaped cross section, such as U-shaped, C-shaped or the like, is applicable as long as the torsion beam comprises an upper-half portion and a lower-half portion. Further, while the example of using the crushes pipe is described in the above-described embodiment, even a torsion beam which is made of a plate member can provide the same effects.

While the above-described embodiment describes the example of the torsion beam which is configured such that the width in the direction perpendicular to the axial center of the arch lower-half portion is almost equal to the width in the direction perpendicular to the axial center of the arch upper-half portion, even a torsion beam which is configured such that the width in the direction perpendicular to the axial center of the arch lower-half portion is different from the width in the direction perpendicular to the axial center of the arch upper-half portion can provide the same effects of the present invention described above as long as the central portion, in the vehicle width direction, of the arch upper-half portion is located at the highest level and the open cross-section of the torsion beam opens forward when the vehicle is in the full-rebound state.

Any other modifications or improvements may be applied within the scope of a sprit of the present invention.

What is claimed is:

1. A suspension of a vehicle, comprising:
a pair of right-and-left trailing arms, front end portions of which are pivotally supported at a vehicle body below a floor panel and rear end portions of which rotatably support a pair of right-and-left wheels; and
a torsion beam extending in a vehicle width direction, both end portions, in the vehicle width direction, of which are connected to the pair of right-and-left trailing arms,
wherein said torsion beam is configured in an arch shape such that a central portion, in the vehicle width direction, thereof projects forward and upward in a slant shape, the central portion being located above the level of a wheel center,
the torsion beam is comprised of an open cross-section member which includes an arch lower-half portion and an arch upper-half portion, a rear end portion of the arch lower-half portion being formed integrally with a rear end portion of the upper-half portion, and
a sectional shape of the arch lower-half portion in a cross section perpendicular to a longitudinal direction of the arch lower-half portion is configured to be substantially horizontal when the vehicle is in a standard state, and the central portion, in the vehicle width direction, of the torsion beam is configured such that a front edge portion of the arch lower-half portion and a front edge portion of the arch upper-half portion are located substantially at the same position in a vehicle longitudinal direction when the vehicle is in a full-rebound state.

2. The suspension of the vehicle of claim 1, wherein the vehicle is provided with a rear-wheel drive device which is arranged at a vehicle-body rear portion and a propeller shaft which is connected to the rear-wheel drive device via a connection portion and extends in the vehicle longitudinal direction, and the propeller shaft is arranged to pass through a space formed below the torsion beam.

3. The suspension of the vehicle of claim 2, wherein said torsion beam is configured such that a rear end portion thereof is located at a position near and above said connection portion when the vehicle is in the full-rebound state.

4. The suspension of the vehicle of claim 1, wherein said torsion beam is configured such that the central portion, in the vehicle width direction, of the arch upper-half portion is located at a position near and below a seat-cushion attachment portion formed at the floor panel when the vehicle is in the full-rebound state.

5. The suspension of the vehicle of claim 2, wherein said torsion beam is configured such that the central portion, in the vehicle width direction, of the arch upper-half portion is located at a position near and below a seat-cushion attachment portion formed at the floor panel when the vehicle is in the full-rebound state.

6. The suspension of the vehicle of claim 3, wherein said torsion beam is configured such that the central portion, in the vehicle width direction, of the arch upper-half portion is located at a position near and below a seat-cushion attachment portion formed at the floor panel when the vehicle is in the full-rebound state.

\* \* \* \* \*